United States Patent
Frank

(10) Patent No.: US 7,372,257 B2
(45) Date of Patent: May 13, 2008

(54) ROTARY SENSOR

(75) Inventor: Ronald I. Frank, Sharon, MA (US)

(73) Assignee: Stonebridge Control Devices, Inc., Canton, MA (US)

( * ) Notice: Subject to any disclaimer, the term of this patent is extended or adjusted under 35 U.S.C. 154(b) by 0 days.

(21) Appl. No.: 11/463,522

(22) Filed: Aug. 9, 2006

(65) Prior Publication Data
US 2007/0080679 A1 Apr. 12, 2007

Related U.S. Application Data

(60) Provisional application No. 60/706,536, filed on Aug. 9, 2005.

(51) Int. Cl.
G01B 7/14 (2006.01)
G01B 7/30 (2006.01)
G01R 33/06 (2006.01)

(52) U.S. Cl. .............................. 324/207.25; 324/207.2

(58) Field of Classification Search .......... 324/207.25, 324/207.21, 207.2, 174; 338/32 R, 32 H
See application file for complete search history.

(56) References Cited

U.S. PATENT DOCUMENTS

2006/0038557 A1 * 2/2006 Johnson ................ 324/207.25
2006/0061353 A1 * 3/2006 Etherington et al. ..... 324/207.2

* cited by examiner

*Primary Examiner*—Reena Aurora
(74) *Attorney, Agent, or Firm*—Grossman, Tucker, Perreault & Pfleger, PLLC

(57) ABSTRACT

A rotary position sensing including a first and second magnet spaced from one another. A first and second triangular magnetic flux director are arranged in a generally diamond shaped configured with an air gap between the two magnetic flux directors. A magnetic field sensor system is positioned in the air gap between the magnetic flux directors. The magnets and the magnetic flux directors, with the magnetic field sensor system in the air gap, are rotatable relative to one another about an axis generally normal to a plane including the magnets and magnetic flux directors. The magnetic field sensor system provides an output in response to a rotational position of the magnets relative to the magnetic flux directors.

20 Claims, 19 Drawing Sheets

SECTION A-A

ROTARY SENSOR

CROSS-REFERENCE TO RELATED APPLICATIONS

This application claims the benefit of U.S. provisional patent application Ser. No. 60/706,536, filed Aug. 9, 2005, the entire disclosure of which is incorporated herein by reference.

FIELD

This disclosure relates to rotary sensors.

BACKGROUND

Rotary sensors may be utilized to monitor a variety of devices that move rotationally. Examples of monitored devices include, but are not limited to, shafts and valves. A variety of conventional rotary sensors are non-contact magnetic rotational sensors having a hall sensor and magnet. As the monitored device is rotated, relative movement occurs between the hall sensor and magnet to cause a change in the magnetic field sensed by the hall sensor. A conventional non-contact magnetic rotational sensor may track the rotation angle with a sine wave output which can not achieve a sufficiently low linearity deviance of output (e.g., less than 4% deviance) beyond 100 degrees of rotation of the monitored device. However, some new applications require a larger range of sufficiently low linearity deviance greater than 100 degrees.

Accordingly, there is a need for a non-contact rotary sensor that has sufficiently low linearity deviance of monitored magnetic filed output over a rotation range greater than 100 degrees.

BRIEF DESCRIPTION OF THE DRAWINGS

Features and advantages of embodiments of the disclosed subject matter will become apparent as the following Detailed Description proceeds, and upon reference to the Drawings, where like numerals depict like parts, and in which.

Although the following Detailed Description will proceed with reference being made to illustrative embodiments, many alternatives, modifications, and variations thereof will be apparent to those skilled in the art. Accordingly, it is intended that the disclosed subject matter be viewed broadly.

DETAILED DESCRIPTION

Figure 1:
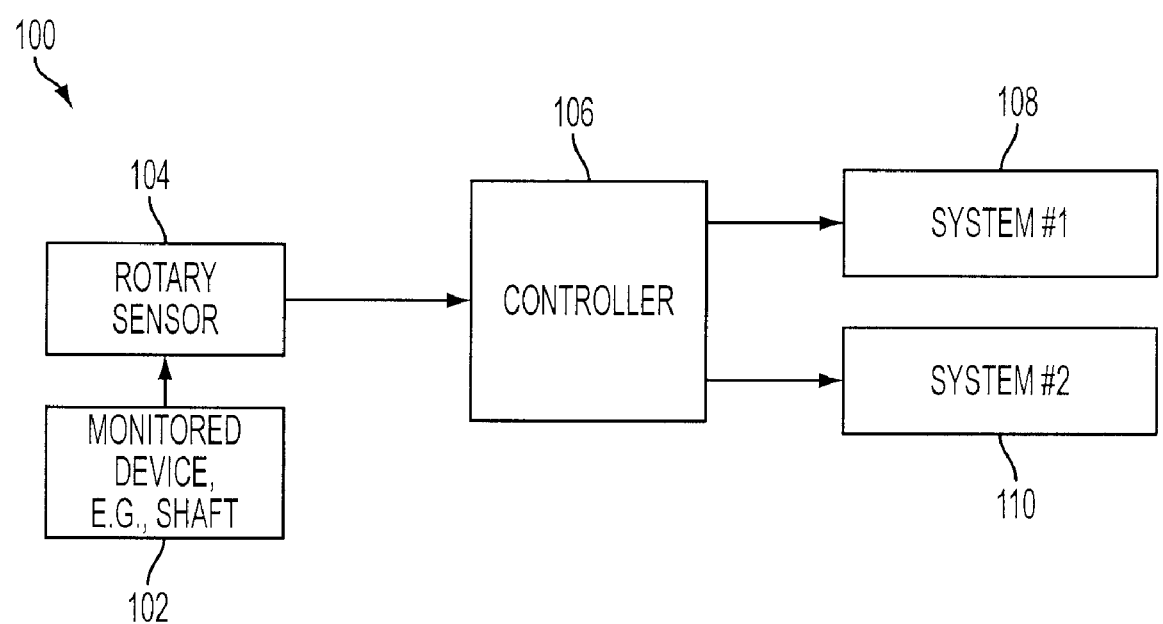
FIG. 1 is a block diagram of a system including a rotary sensor consistent with an embodiment.

FIG. 1 is a block diagram of a system 100 including a rotary sensor 104 consistent with an embodiment. The system 100 may include a monitored device 102 such as a shaft, the rotary sensor 104 consistent with an embodiment, a controller 106, and systems 108, 110 controlled by the controller 106. The rotary sensor 104 may be utilized in a variety of automotive systems to monitor the rotational angle of the monitored device 102. In one embodiment, the monitored device 102 may be a power output shaft of a tractor and the rotary sensor 104 may monitor the rotational angle of the power output shaft. The rotational position of the power output shaft may be output to the controller 108 which may further utilize that information to control other systems 108, 110.

In another embodiment, the monitored device may be a steering shaft of a vehicle steering system. The rotary sensor 104 may then provide the rotational position of the steering wheel to the controller 106. The controller 106 may utilize the position of the steering wheel in its control of other vehicle systems 108, 110. For example, system 108 may be an automatic braking system where braking is influence by the position of the steering wheel. System 110 may be a traction control system when engine responsiveness and other parameters are also influenced by the position of the steering wheel.

Figure 2:
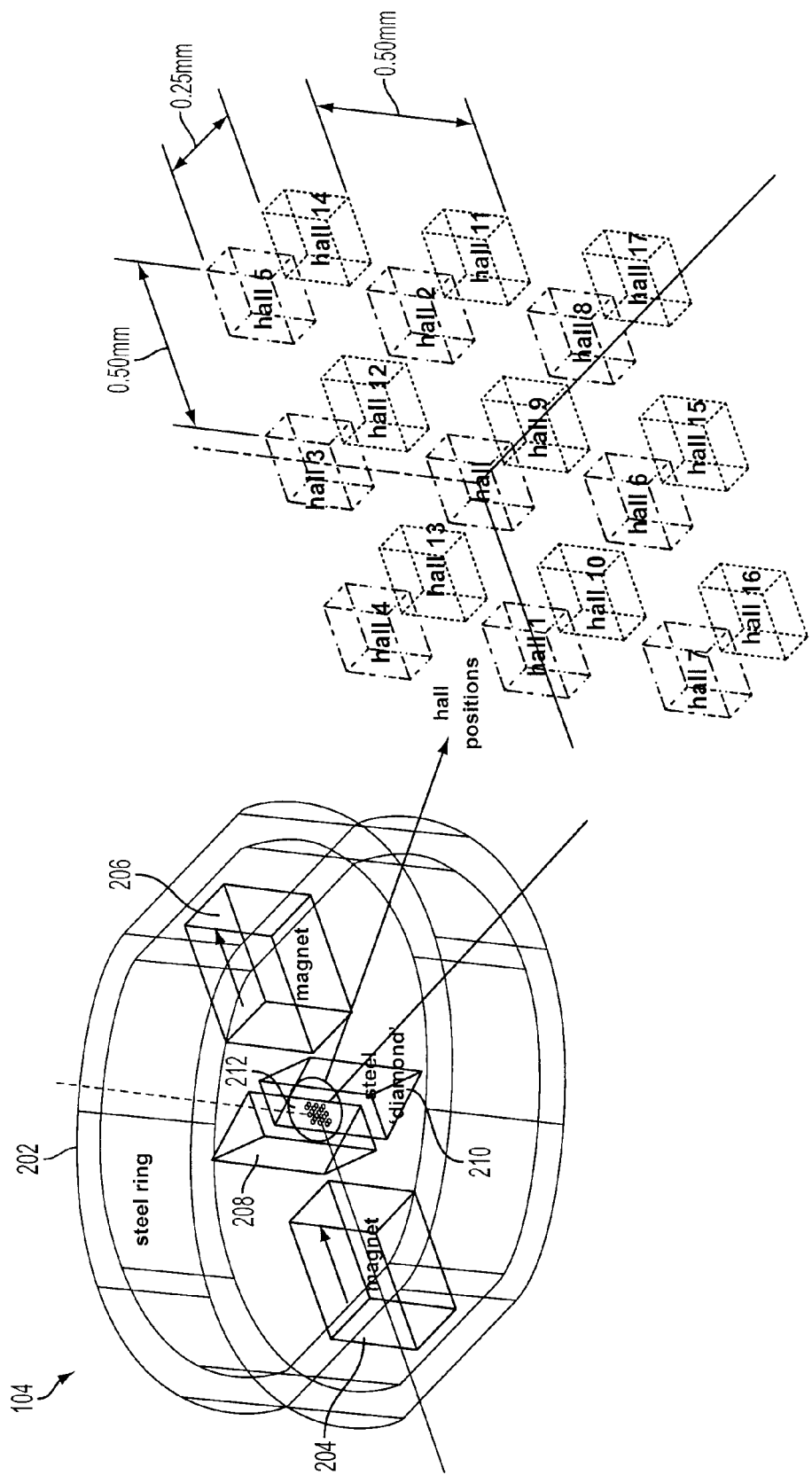
FIG. 2 is a perspective view of the rotary sensor of FIG. 1.

FIG. 2 is a perspective view of the rotary sensor 104 of the system of FIG. 1. The rotary sensor 104 may include a ring 102, magnets 204 and 206, magnetic field sensor system, such as a hall sensor system 212, and magnetic flux directors 208, 212. The ring 202 may be a steel ring and the magnets 204, 206 may be permanent magnets orientated in a diametrically opposed arrangement as illustrated in FIG. 2. Additionally as shown, the magnets may be magnetized along generally parallel, or even collinear, direction. Other arrangements of the magnets may also be employed consistent with the present invention. The hall sensor system 212 may be located in an air gap defined by the two magnetic flux directors 208, 210. The magnetic flux directors 208, 210 may each have a triangular cross section that together form a diamond type shape. The magnetic flux directors 208, 210 may be made of steel in one embodiment.

The hall sensor system 212 may include a plurality of hall sensors as illustrated, for example, in the exploded section of FIG. 2. In one embodiment, the hall sensor system 212 may include an array of eighteen hall sensors labeled "hall" to "hall 17" in FIG. 2. The eighteen hall sensors may be positioned as illustrated in FIG. 2. There may be three horizontal planes having six hall sensors each. One plane may include hall 4, hall 13, hall 3, hall 12, hall 5, and hall 14. An edge of hall 3 may be positioned 0.5 mm from an edge of hall 5, while an edge of hall 5 may be positioned 0.25 mm from an edge of hall 14. The vertical distance between the horizontal planes may be 0.5 mm as an edge of hall 11 may be 0.5 mm form an edge of hall 14. Various other magnetic field sensors other than hall sensors may be used in connection with a rotary sensor consistent with the present invention.

Advantageously, the magnetic flux directors 208, 210 may induce more magnetic field strength as natural sine like tail-off angles are reached thereby elongating, e.g., in terms of the rotational range of movement, the straight, or linear, portion of the output curve. The nature of the high uniform induction of the diamond and ring-shaped magnetic flow path makes the sensor robust against assembly tolerances, movement tolerances, e.g., slop, and external magnetic interferences. Various designs may incorporate leaded, e.g., stand-up, or surface mount hall sensors. The magnetic flux directors 208, 210 may be made of steel and have a triangular-shaped cross section.

The magnets 204, 206 and the magnetic flux directors 208, 210, with the magnetic field sensor 212 disposed in the air gap, may rotate relative to one another. For example, the magnets 204, 20 and the magnetic flux directors 208, 210, with the magnetic field sensor system 212 in the air gap between the magnetic flux directors 208, 210, may rotate relative to one another about an axis that is generally normal to a plane including the magnets 204, 206 and the magnetic flux directors 208, 210. In various embodiments, the ring 202 may maintain a constant rotational relationship relative to the magnets 204, 206. In one such an embodiment, the ring 202 may rotate with the magnets 204, 206 relative to the magnetic flux directors 208, 210. The magnetic field sensor system 212 may provide an output in response to a rotational position of the magnets 204, 206 relative to the magnetic flux directors 208, 210.

Figure 3:
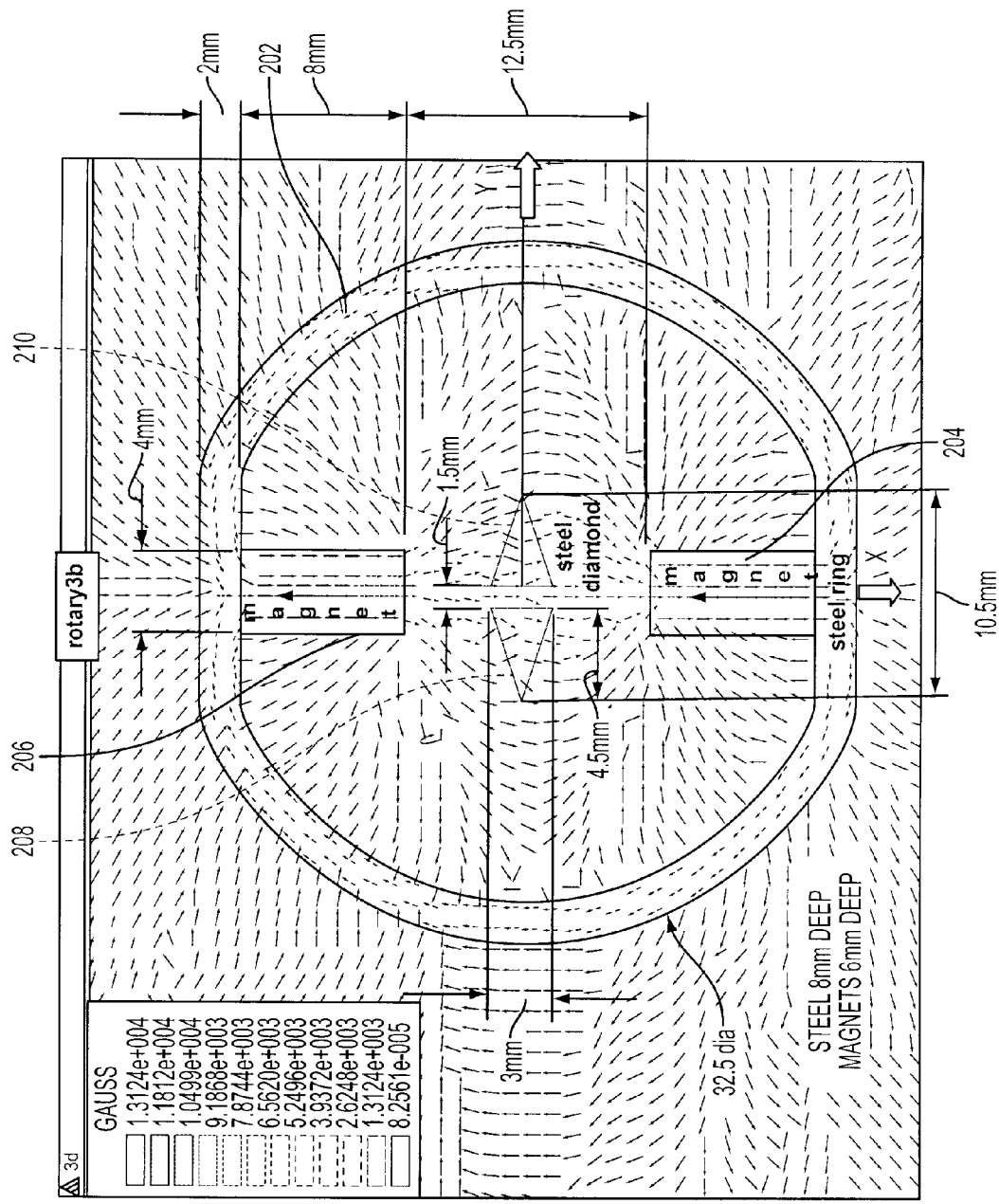
FIG. 3 is a plot of the magnetic field induced by the magnets of the rotary sensor of FIG. 2.

FIG. 3 illustrates a plot of the magnetic field strength in gauss induced by the magnets of the rotary sensor of FIG. 2. As illustrated, the magnetic flux directors 208, 210 may induce more magnetic field strength as natural sine like tail-off angles are reached thereby elongating (rotational range) the straight (linear) portion of the output curve. As illustrated in FIG. 3, in one embodiment each magnet 204, 206 may have a rectangular cross section and may have a width of 4 mm, a length of 8 mm, and a depth of 8 mm. The steel ring 202 may have a 32.5 mm diameter and the air gap formed between the two magnetic flux directors 208, 210 may be 1.5 mm. The dimensions set forth herein pertain to one possible exemplary embodiment consistent with the present invention, and should not, therefore, be construed as limiting.

Figure 4A:
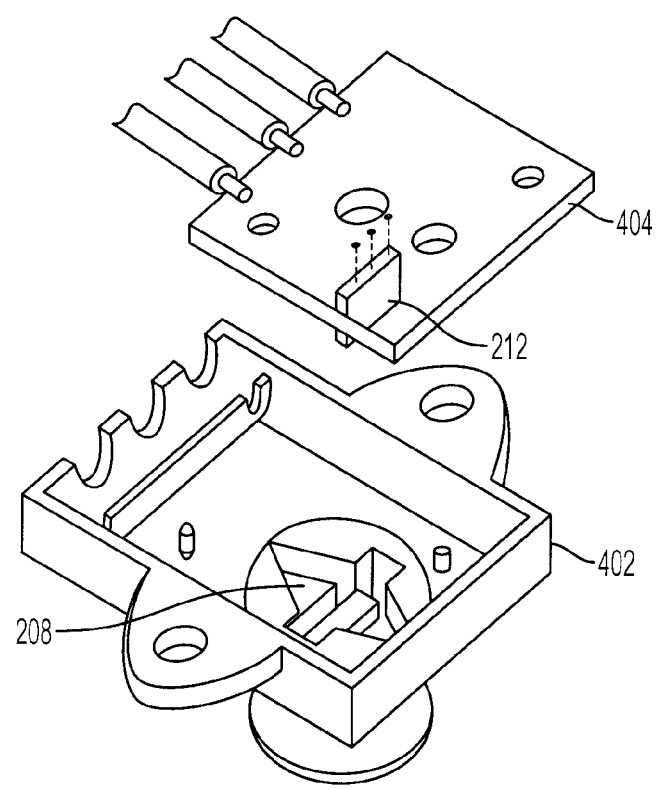
FIGS. 4a and 4b are a perspective and cross-sectional view, respectively, of a packaging embodiment for packaging the rotary sensor of FIG. 2.
Figure 4B:
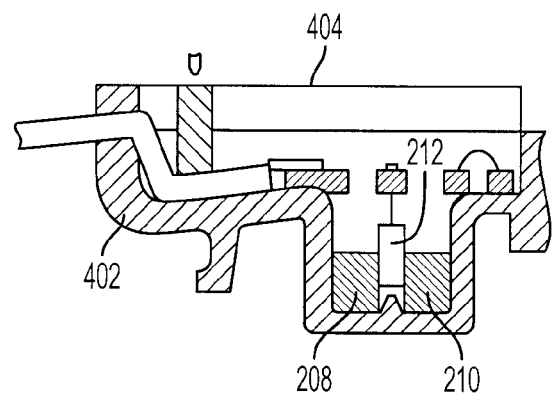

FIGS. 4a and 4b illustrate a perspective and cross-sectional views of a packaging embodiment for packaging the rotary sensor 104 of FIG. 2. The packaging embodiment may include a lower housing portion 402 and a cover 404 to mate therewith to provide an electronics housing. The lower housing portions 402 may include portions shaped and configured to accept the components of the rotary sensor 104, e.g., magnetic flux directors 208, 210, hall sensor system 212, etc. The upper housing portion 404 may, in some embodiments include a printed circuit board including hall sensor system 212. As shown in the cross-sectional view of FIG. 4b, the upper housing portion 404 may be assembled to the lower housing portion 402 and may potted, e.g., the internal space between the housing portions 402, 404 may be filled with a resin.

Figure 5A:
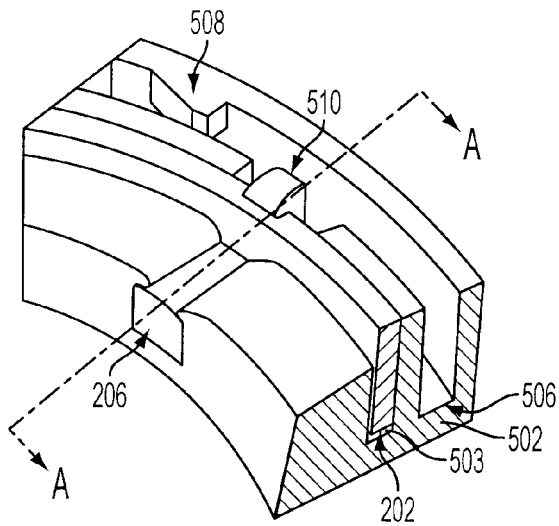
FIG. 5a is a cut away perspective view of the rotary sensor of FIG. 2.
Figure 5B:
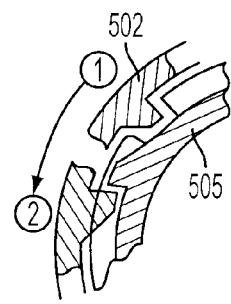
FIG. 5b is a detail view showing an assembly of an electronic housing and a mechanical housing consistent with and embodiment of the present invention.

FIG. 5a illustrates a perspective view of a portion of an embodiment of mechanical housing for the rotary sensor 104 of FIG. 2. The magnet 206 may be heat staked into an associated slot in the housing 502. An annular slot 503 in the housing 502 may accept the steel ring 202. Another annular slot 506 in the housing 502 may be configured to accept a torsion spring 514. A bias snap 508 and ring snap 510 may further be included in the mechanical housing 502. The ring snap 510 may retain the steel ring 202 in the mechanical housing 502. A ring 505 of the electronic housing, which may include lower housing portion 402, may slide into the associated slot 506 in the mechanical housing 502 and then be rotated so that the bias snap may snap over the electronic housing. The ring 505, and the electronic housing therewith, may be retained to the mechanical housing 502 and may be biased with the torsion spring 514, as shown in FIG. 5b.

Figure 6:
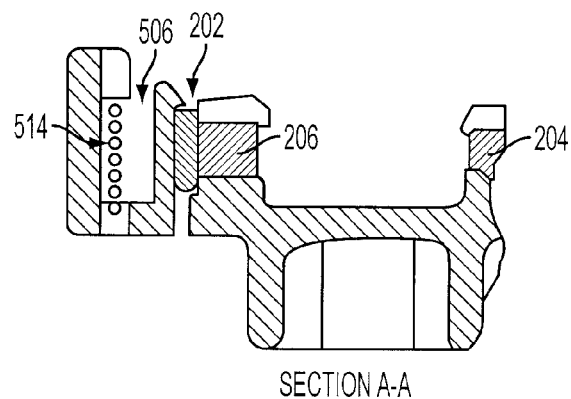
FIG. 6 is a cross sectional view of the rotary sensor of FIG. 5 taken along the line A-A of FIG. 5.

FIG. 6 is a cross sectional view taken along the line A-A of FIG. 5 illustrating the torsion spring 514, the steel ring 202 snapped into a slot in the housing, and the magnets 204, 206.

Figure 7:
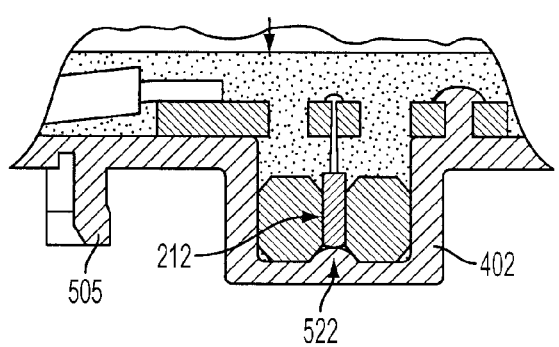
FIG. 7 is a cross sectional view of an electronic housing of the rotary sensor of FIG. 2.

FIG. 7 is a cross sectional view of an embodiment of electronic housing for the rotary sensor 104. A steel triangle divider 522 may separate the triangular shaped magnetic flux directors 208, 210. The hall sensor system 212 may be positioned generally between the two triangular shaped magnetic flux directors 208, 210.

Consistent with the foregoing embodiment, the electronic housing, including hosing portions 402 and 404, and the mechanical housing 502 may be rotated relative to one another. For example, the electronic housing may be maintained in a stationary position, and the mechanical housing 502 may be rotated relative to the electronic housing. In other embodiments the electronic housing may be rotated relative to mechanical housing, or both housings may be rotated relative to one another. Rotation of the housing relative to one another may cause relative rotational movement of the magnets 204, 206 and the ring 202 relative to the magnetic flux directors 208, 210 and the magnetic sensor system, e.g., the hall sensor system 212, thereby varying the magnetic flux imparted on the hall sensor system 212. The hall sensor system 212 may provide an output based on the magnetic flux imparted on the hall sensor system, and therefore based on the rotational position of the mechanical housing relative to the electronic house.

The rotational position of an element, e.g., a steering shaft, output shaft, etc., may be determined by coupling the element to one of the housings, e.g., the mechanical housing, for effecting rotation of the housing upon rotation of the element. The hall sensor system may provide an output based on the magnetic flux imparted thereto, and therein may provide an output which may be indicative of a rotational position of the housing relative to one another, and therefore indicative of a rotational position of the element.

Figure 8:
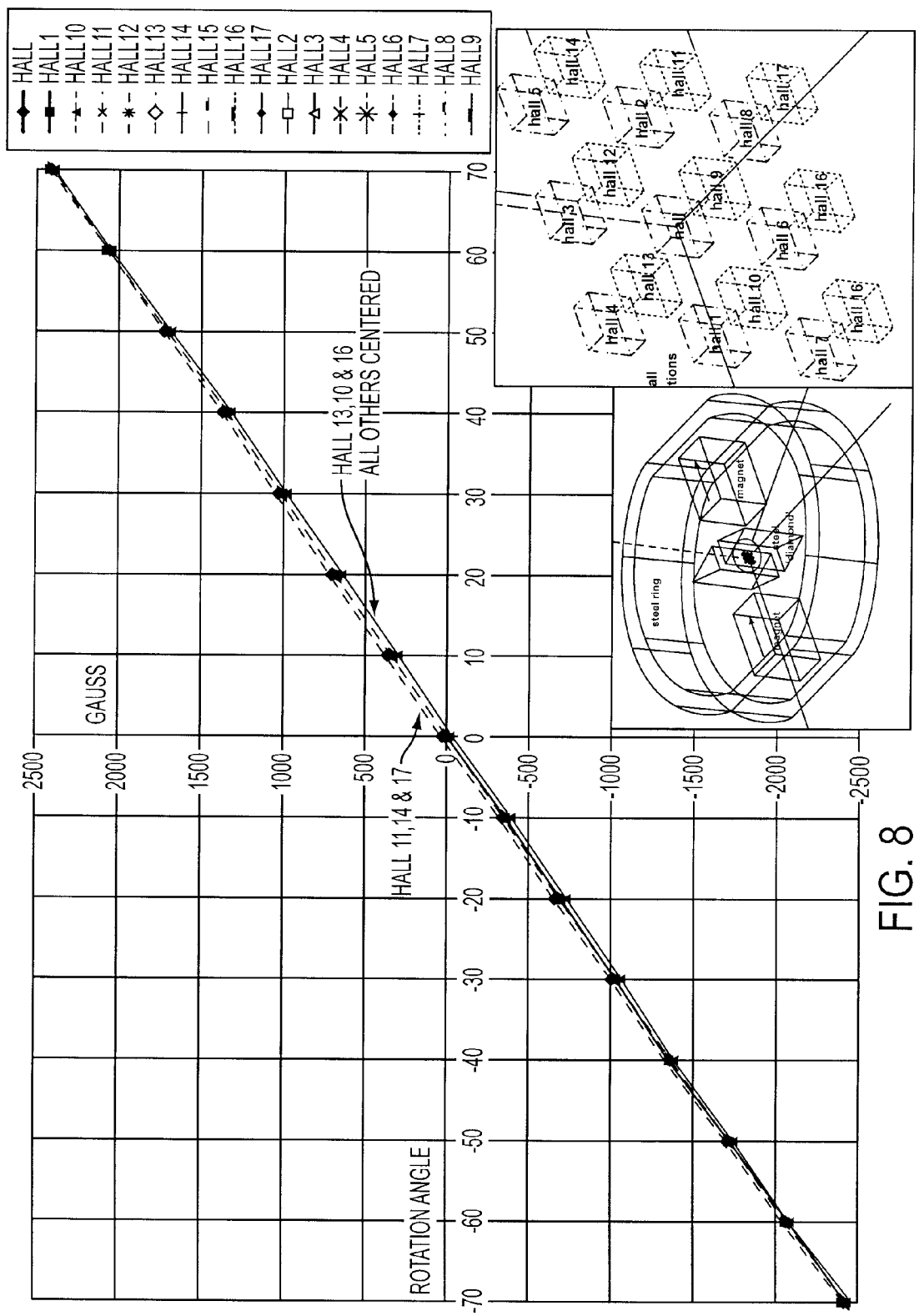
FIG. 8 illustrates plots of the magnetic field in gauss output each hall sensor of the hall sensor system of FIG. 2 over a rotation range of 140 degrees.

FIG. 8 illustrates plots of the magnetic field in gauss output each hall sensor of the hall sensor system 212 of the rotary sensor 104 of FIG. 2 over a rotation range of 140 degrees. As illustrated, the gauss output of each of the eighteen hall sensors remains reasonably linear as the monitored angle of rotation changes over a 140 degree range from negative 70 degrees to positive 70 degrees. Halls 11, 14, and 17 are slightly above a center line and halls 13, 10, and 16 are slightly below the center line while all other halls are centered. As shown, the rotary sensor 104 has good linearity to at least 140 degrees of rotation.

Figure 9:
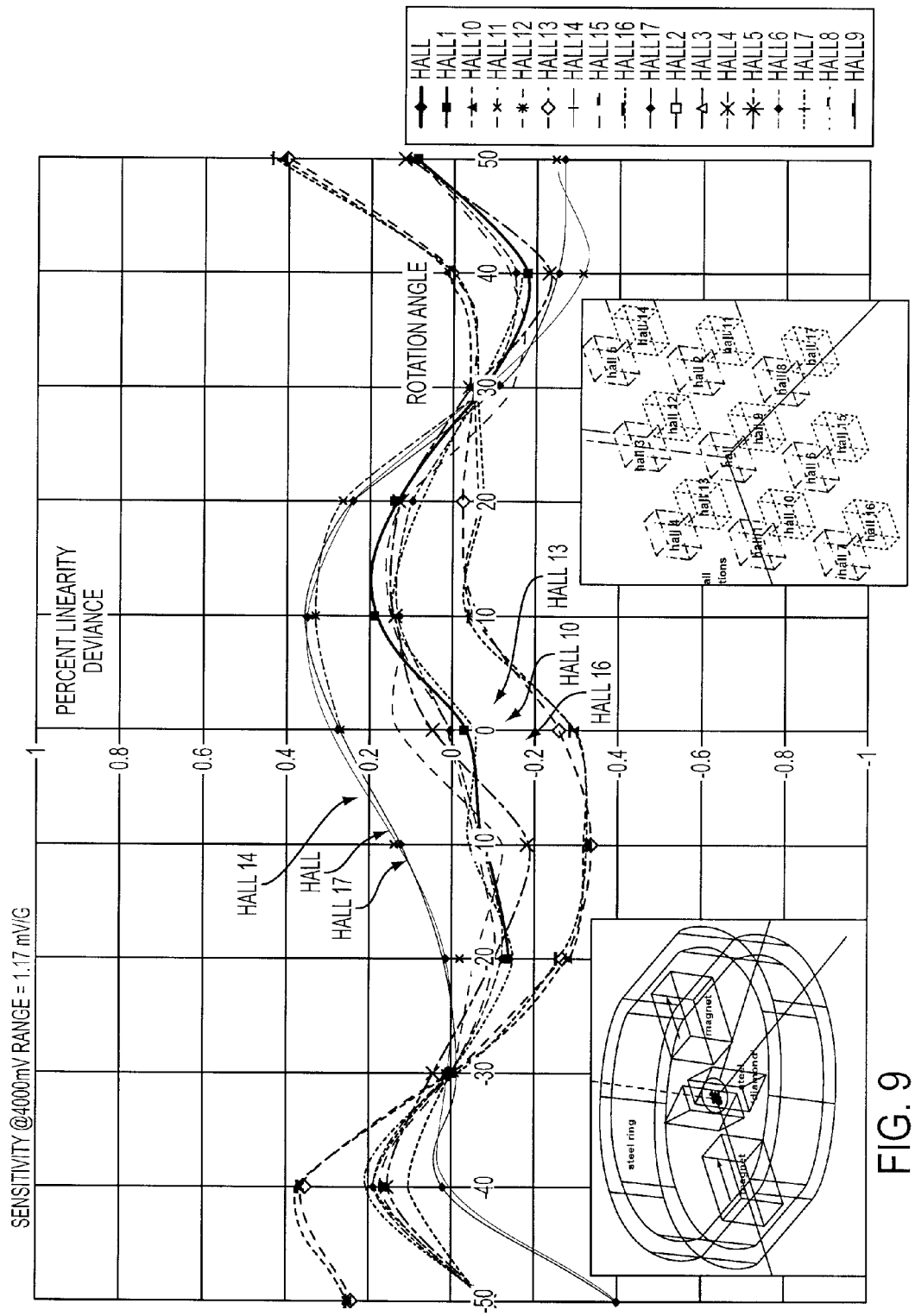
FIG. 9 illustrates plots of the percent linearity deviance of the output of each of the hall sensors of the hall sensor system of FIG. 2 over a rotation range of 100 degrees.

FIG. 9 illustrates plots of the percent linearity deviance over 100 degrees of rotation between negative 50 degrees and positive 50 degrees for the rotary sensor 104 consistent with an embodiment. As illustrated, the percent linearity deviance is less than about 0.4% for rotation angles from negative 50 degrees to slightly less than 50 degrees for all the hall sensors. Consistent with FIG. 8, halls 11, 14, and 17 have the higher positive deviance from the straight line and halls 16, 10, and 13 have the lower negative deviance from the straight line.

Figure 10:
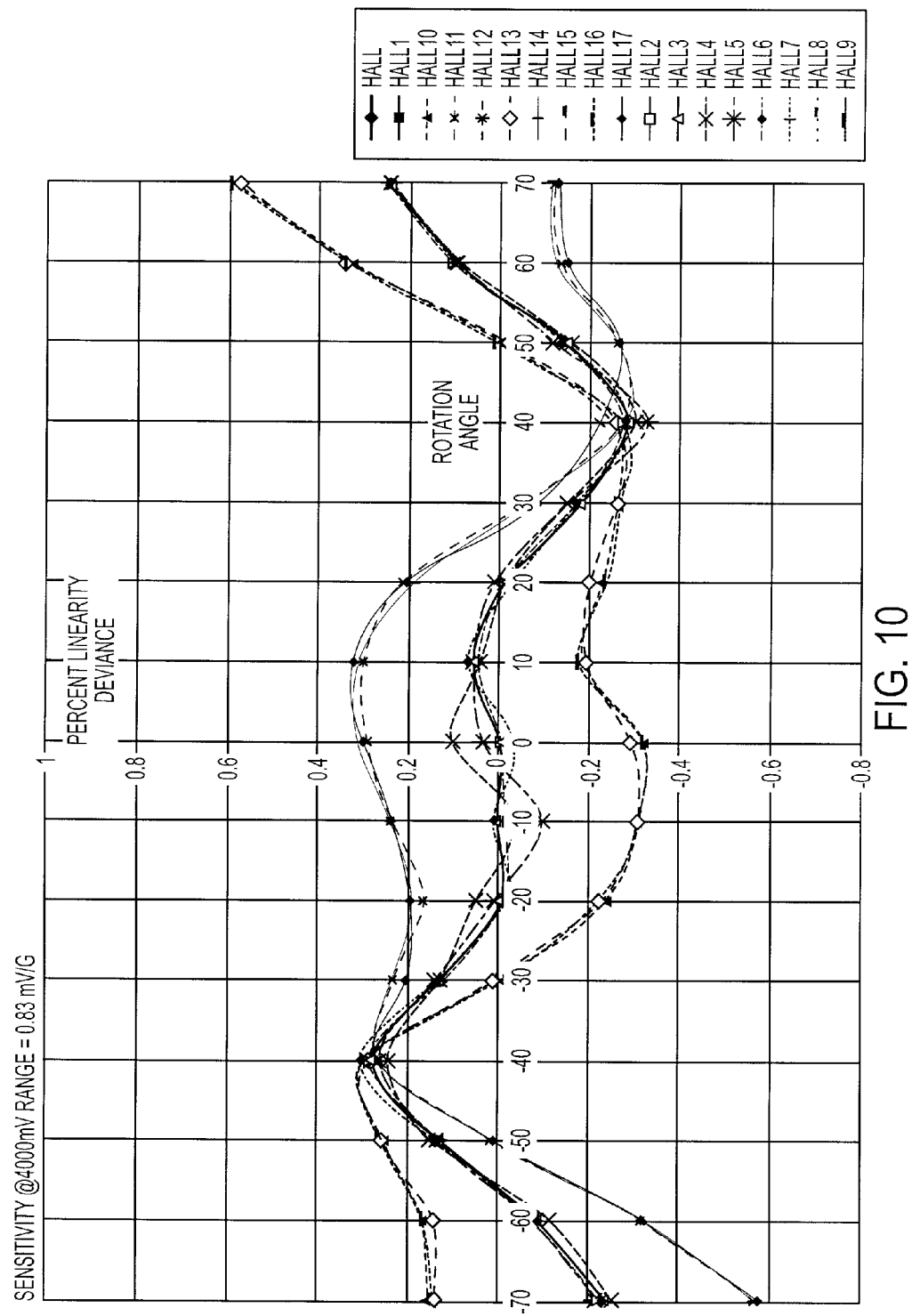
FIG. 10 illustrates plots of the percent linearity deviance of the output of each of the hall sensors of the hall sensor system of FIG. 2 over a rotation range of 140 degrees.

FIG. 10 illustrates plots of the percent linearity deviance over 140 degrees of rotation between negative 70 degrees and positive 70 degrees for the rotary sensor 104 consistent with an embodiment. As illustrated, the percent linearity deviance is less than about 0.6% for rotation angles from negative 70 degrees to 70 degrees for all the hall sensors.

Figure 11:
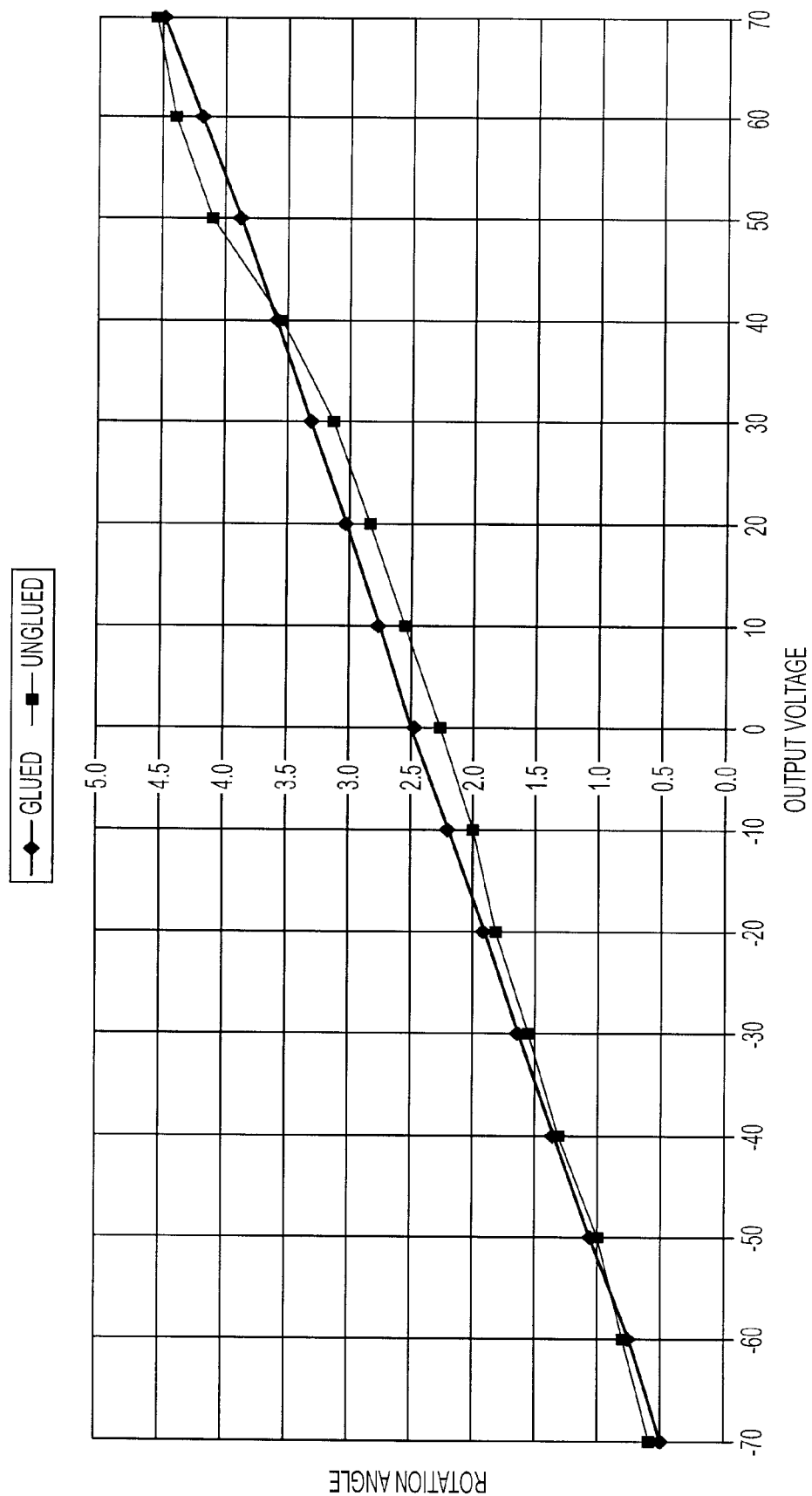
FIG. 11 illustrates plots of test results of the rotary sensor of FIG. 2 illustrating the output voltage over a rotation range of 140 degrees.

FIG. 11 illustrates a plot of test results over 140 degrees of rotation for the rotary sensor 104 consistent with an embodiment. The plot identified with diamond-shaped markers represents test results of output voltage over the 140 degrees of rotation range when the electronics are secured in position, e.g., glued, and the plot identified with square shaped markers represents test results over the same range when the electronics are not secured. As illustrated in FIG. 11, better test results were obtained when the electronics were secured or fixed and not permitted to move about.

Figure 12:
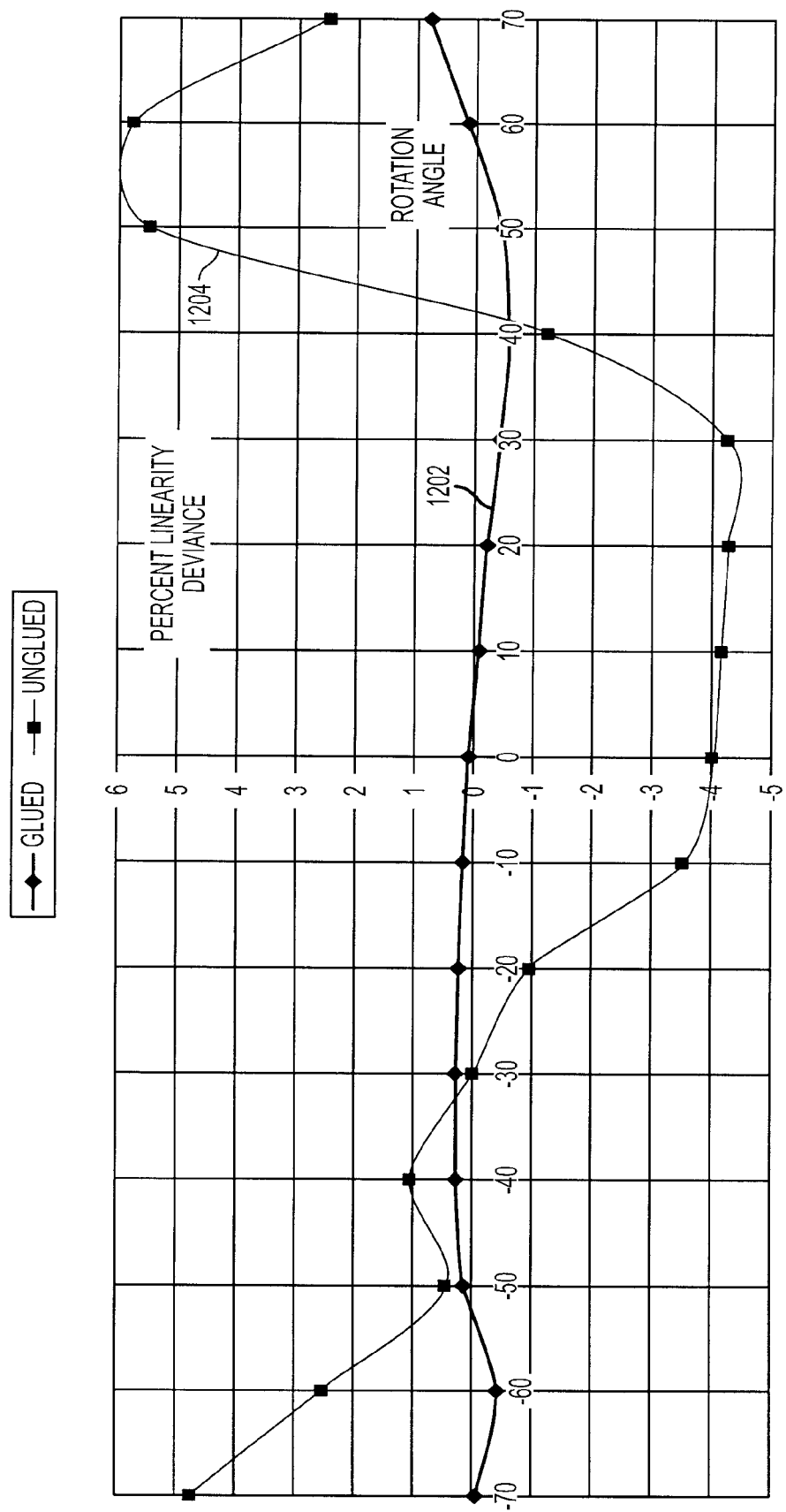
FIG. 12 illustrates plots of percent linearity deviance for rotary sensor of FIG. 2 over the same 140 degree rotation range illustrated in FIG. 11.

FIG. 12 illustrates plots 1202 and 1204 of the linearity deviance over the same 140 degrees of rotation range. As illustrated, the percent of linearity deviance remained less than 1 percent for plot 1202 while increased to as much as 6% for plot 1204. Plot 1202 corresponds to test results when the electronics are secured in position while plot 1204 represents test results when the electronics are not secured and permitted to move about. Again, FIGS. 11 and 12 illustrate better test results with less linearity deviance where obtained when the electronics were secured or fixed and not permitted to move about.

Figure 13:
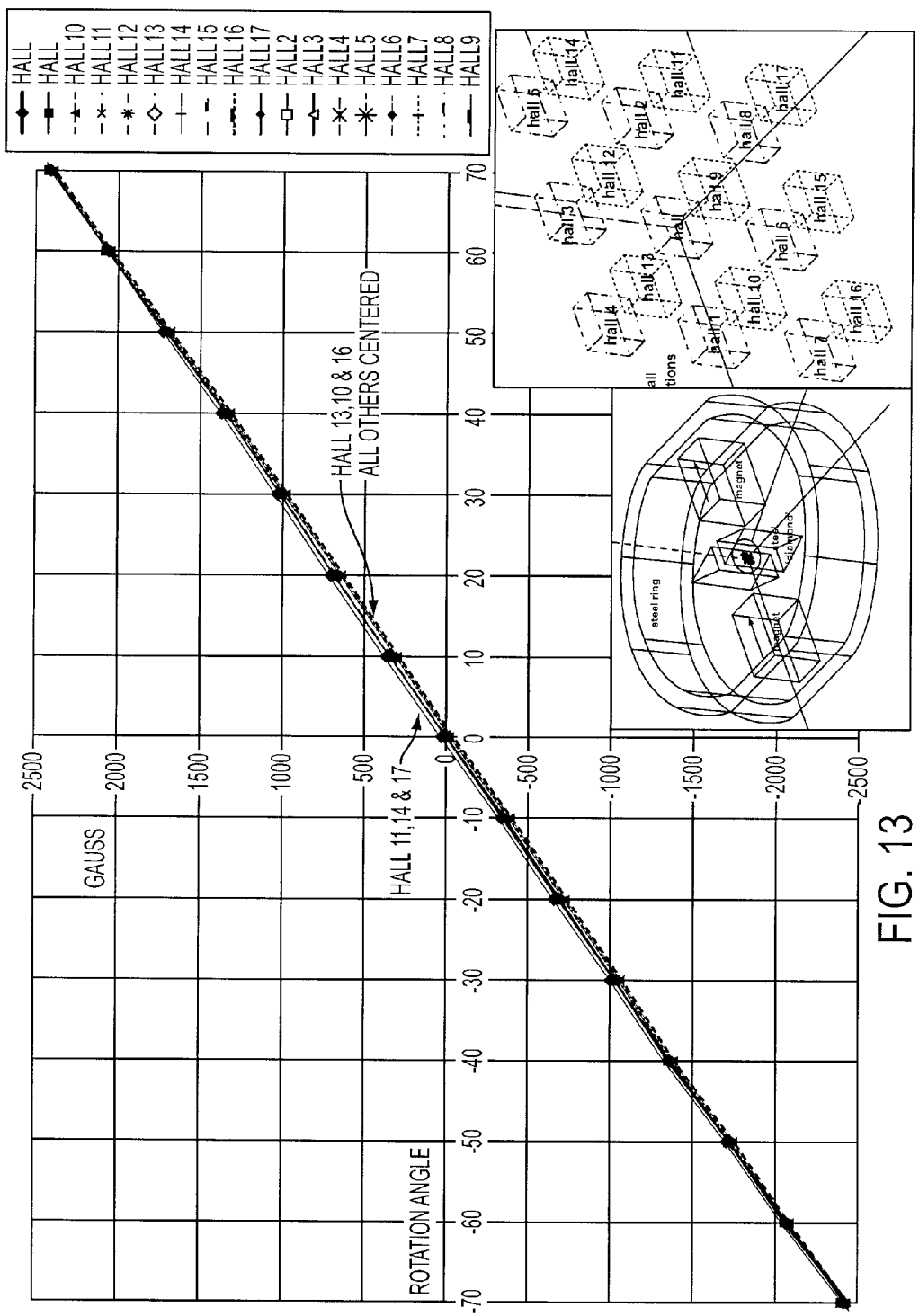
FIG. 13 illustrates plots of the magnetic field in gauss output each hall sensor of the hall sensor system of FIG. 2 over a rotation range of 140 degrees where the offset of the magnetic flux directors is present.
Figure 14:
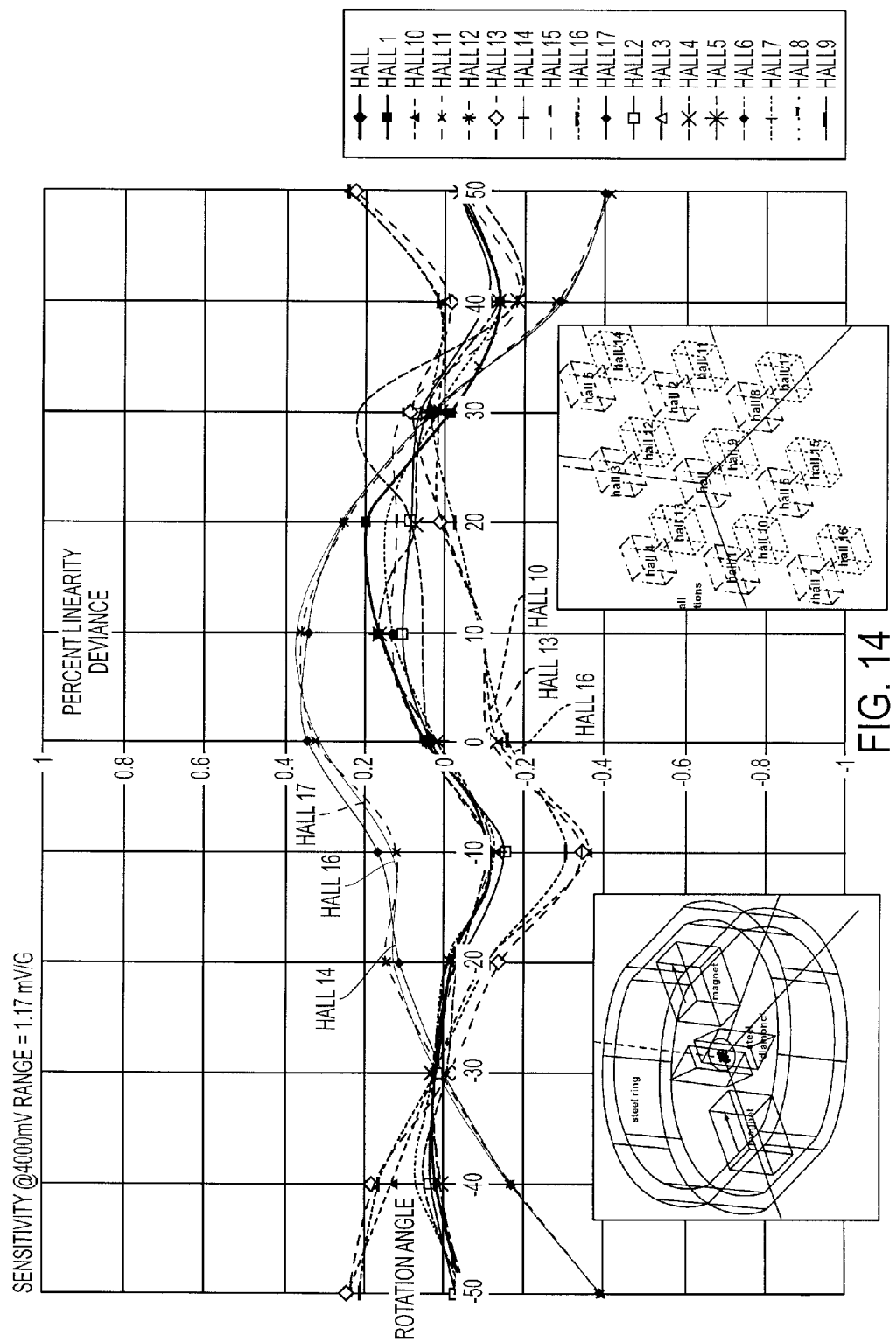
FIG. 14 illustrates plots of the percent linearity deviance for the rotary sensor having the same offset of the magnetic flux directors specified for FIG. 12 over a rotation range of 100 degrees.
Figure 15:
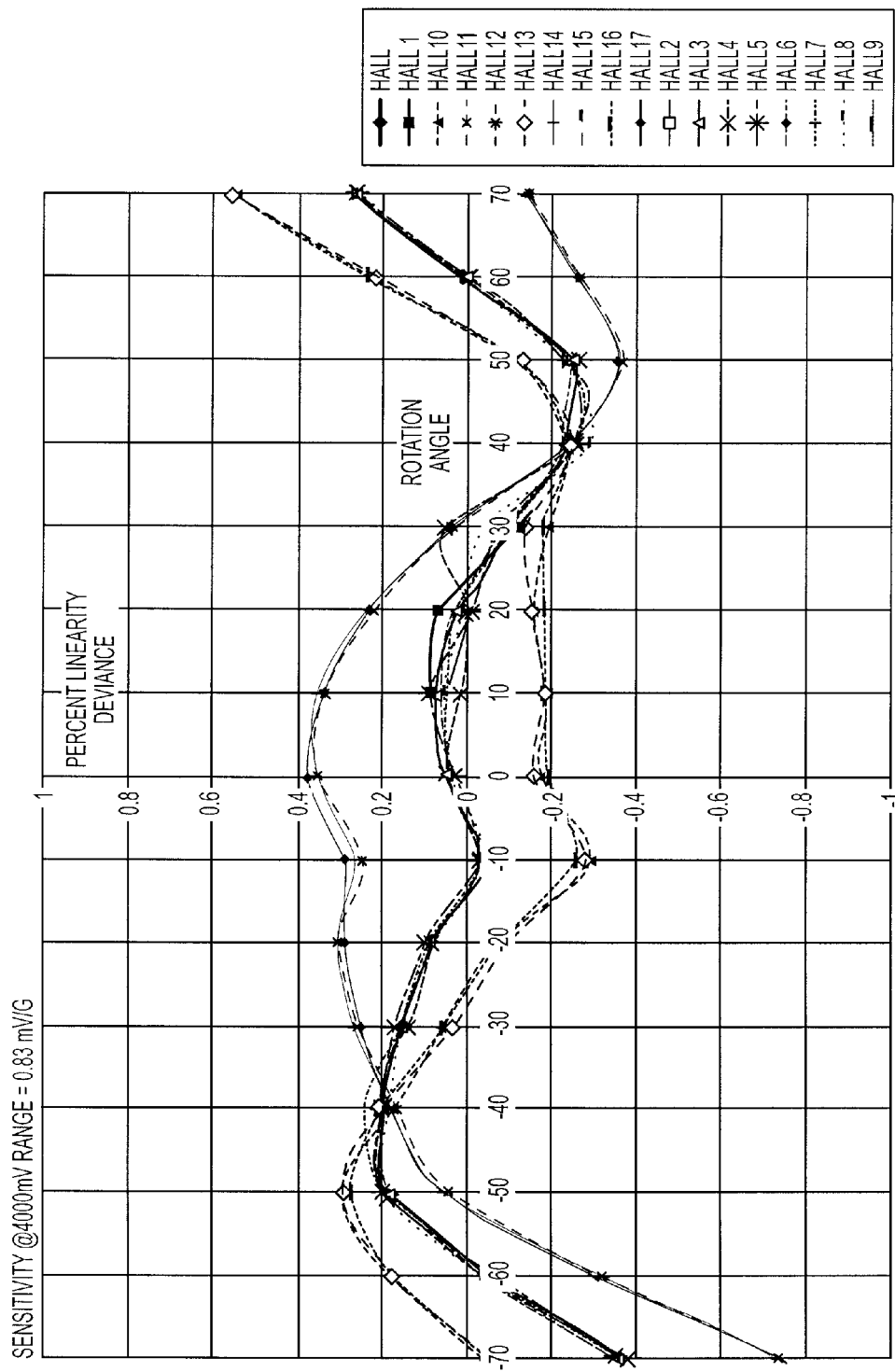
FIG. 15 illustrates plots of the percent linearity deviance for the rotary sensor having the same offset of the magnetic flux directors specified for FIG. 12 over a rotation range of 140 degrees.

FIG. 13 is a plot of monitored gauss output of each of the eighteen hall sensors of the hall sensor system 212 of the rotary sensor 104 where the diamond shape formed by the two magnetic flux directors 208 and 212 is offset by 0.25 mm due to assembly play after programming. Despite the assembly play the output is still reasonably linear over the rotation range of 140 degrees. FIG. 14 illustrates plots of the percent linearity deviance for the hall sensors over a 100 degree rotational output range with FIG. 15 illustrates plots of the percent linearity deviance for the hall sensors over a 140 degree range. Both FIGS. 14 and 15 have a 0.25 mm offset due to assembly play after programming. Again, FIGS. 13, 14, and 15 illustrate that the sensor assembly is tolerant of assembly errors creating offset.

Figure 16:
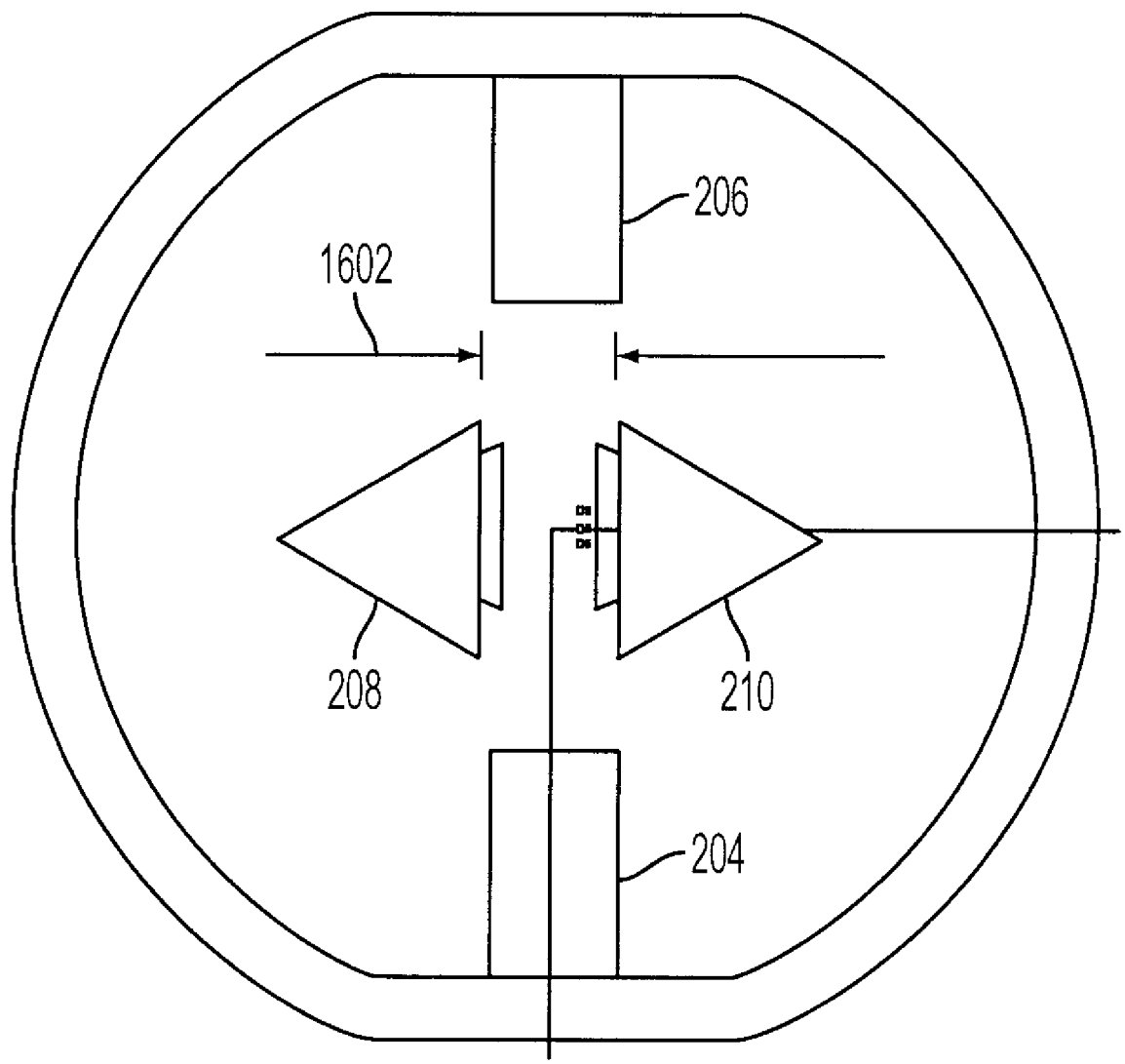
FIG. 16 is a plan view of another rotary sensor consistent with an embodiment having a wider air gap between magnetic flux directors than that of FIG. 3.

FIG. 16 illustrates a rotary sensor assembly where compared to FIG. 3, a relatively wide gap as detailed by gap 1602 between the magnetic flux directors 208 and 210 may be necessary for assembly. The wider gap 1602 may be as wide as the magnets 204, 206, which in one embodiment may be as wide as 4 mm.

Figure 17:
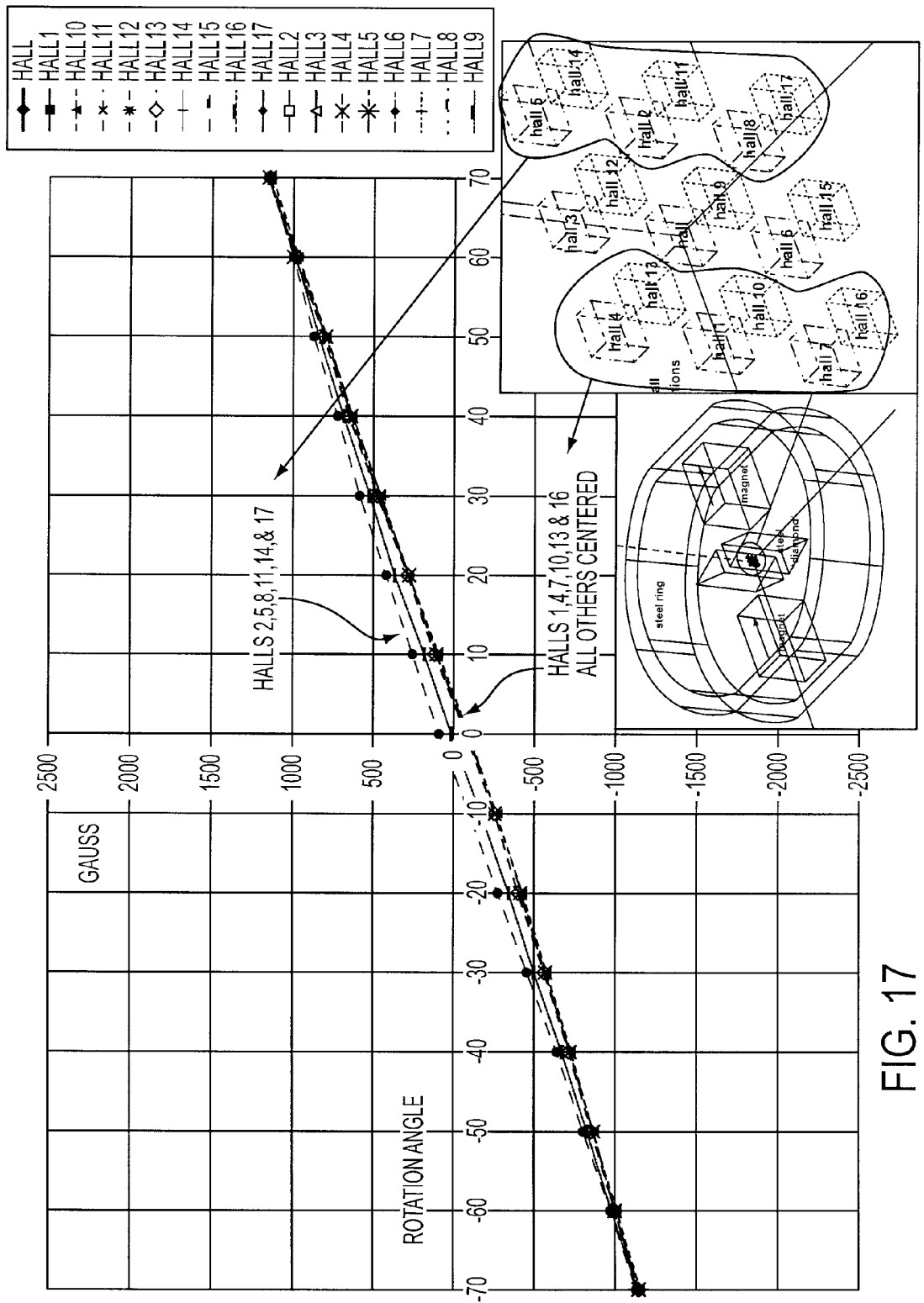
FIG. 17 illustrates plots of the magnetic field in gauss output each hall sensor of the hall sensor system of FIG. 2 over a rotation range of 140 degrees having the wider air gap between magnetic flux directors as specified in FIG. 16.

FIG. 17 illustrates plots of the monitored gauss output of each of the eighteen hall sensors of the hall sensor system 212 having the relatively wide air gap between the magnetic flux directors 208 and 210 as illustrated in FIG. 16. As detailed, despite the wider air gap between the magnetic flux directors 208 and 210, the output is still reasonably linear over the rotation range of 140 degrees.

Figure 18:
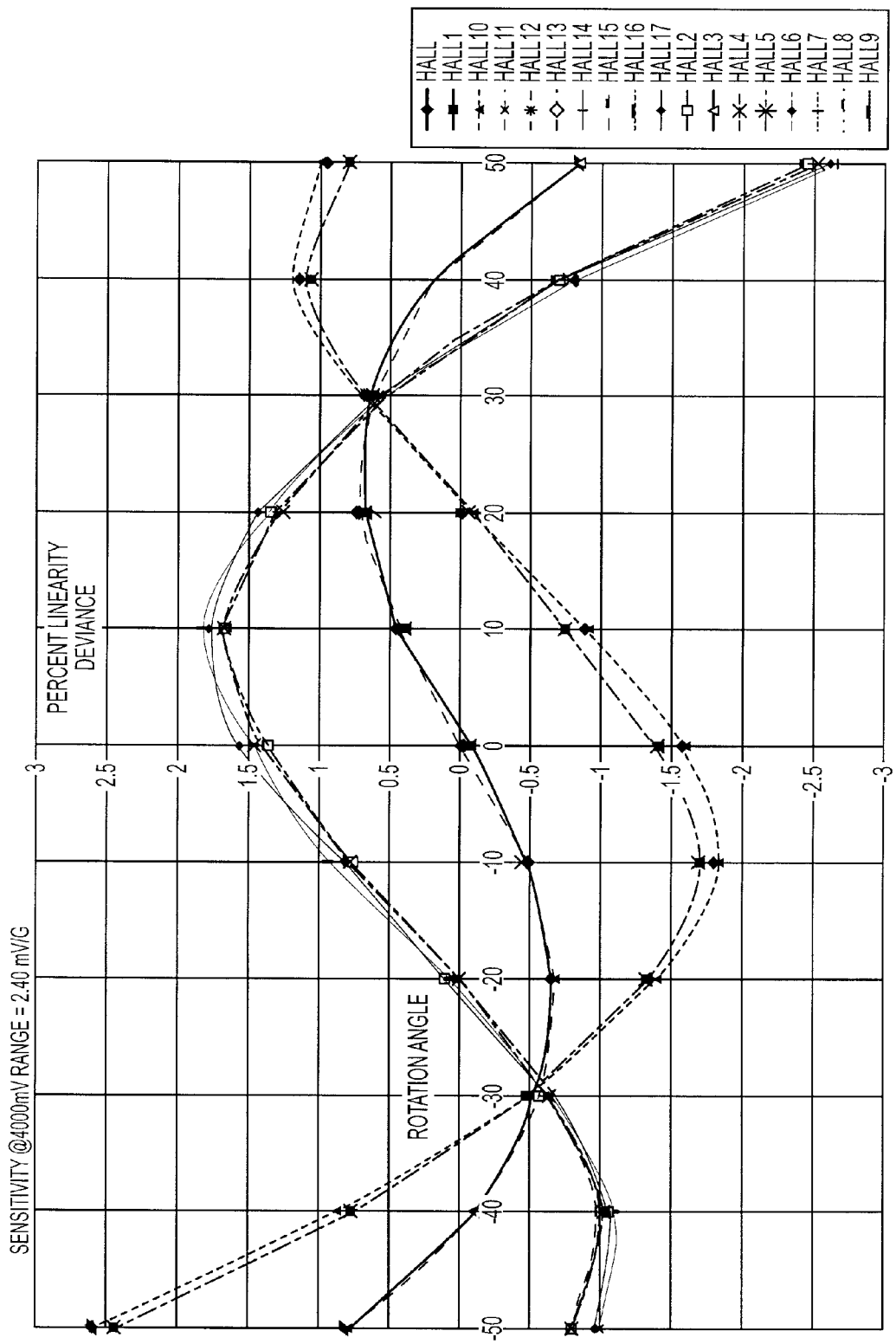
FIG. 18 illustrates plots of the percent linearity deviance for the rotary sensor having the wider air gap between magnetic flux directors as specified in FIG. 16 over a rotation range of 100 degrees.
Figure 19:
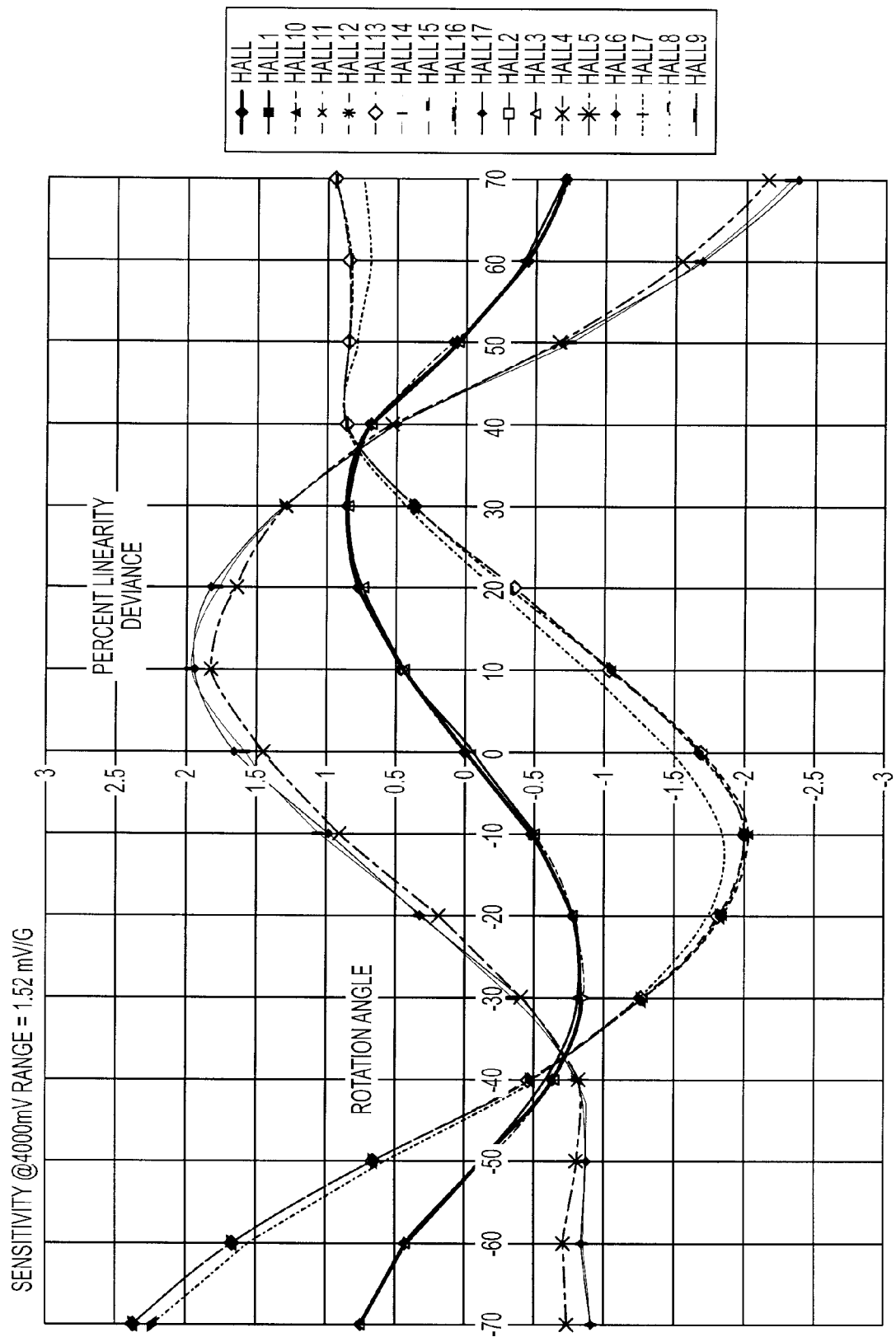
FIG. 19 illustrates plots of the percent linearity deviance for the rotary sensor having the wider air gap between magnetic flux directors as specified in FIG. 16 over a rotation range of 140 degrees.

FIG. 18 illustrates plots of the percent linearity deviance for the hall sensors over a 100 degree rotational output range while FIG. 19 illustrates plots of the percent linearity deviance for the hall sensors over a 140 degree range. Both FIGS. 18 and 19 have the relatively wider air gap between the magnetic flux directors 208 and 210 as illustrated in FIG. 16 and the percent linearity deviance is less than about 2.5% over the 100 degree range (FIG. 18) and also less than about 2.5% over the 140 degree range (FIG. 19).

Figure 20:
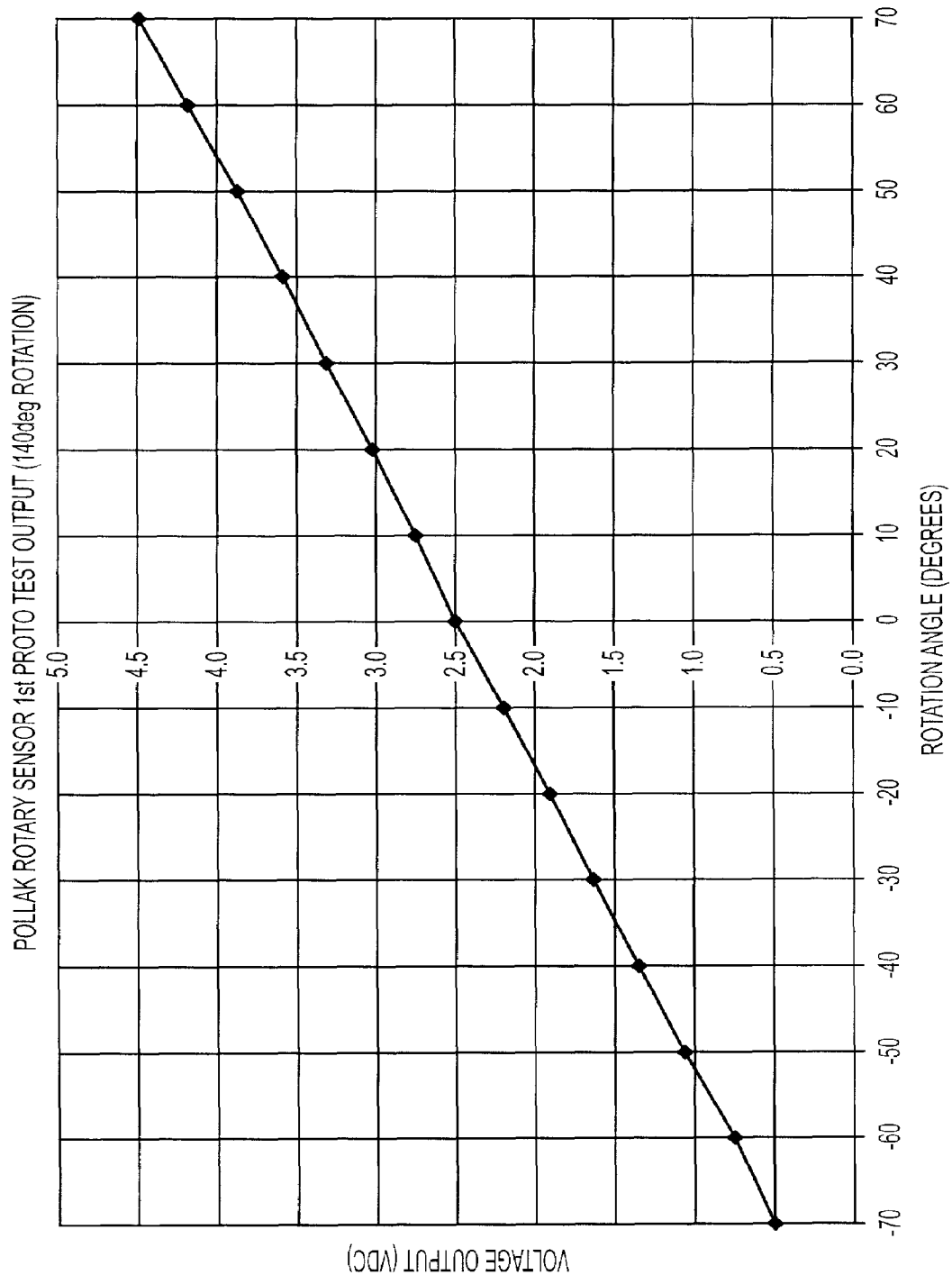
FIGS. 20 and 21 illustrate test results for a rotary sensor prototype.
Figure 21:
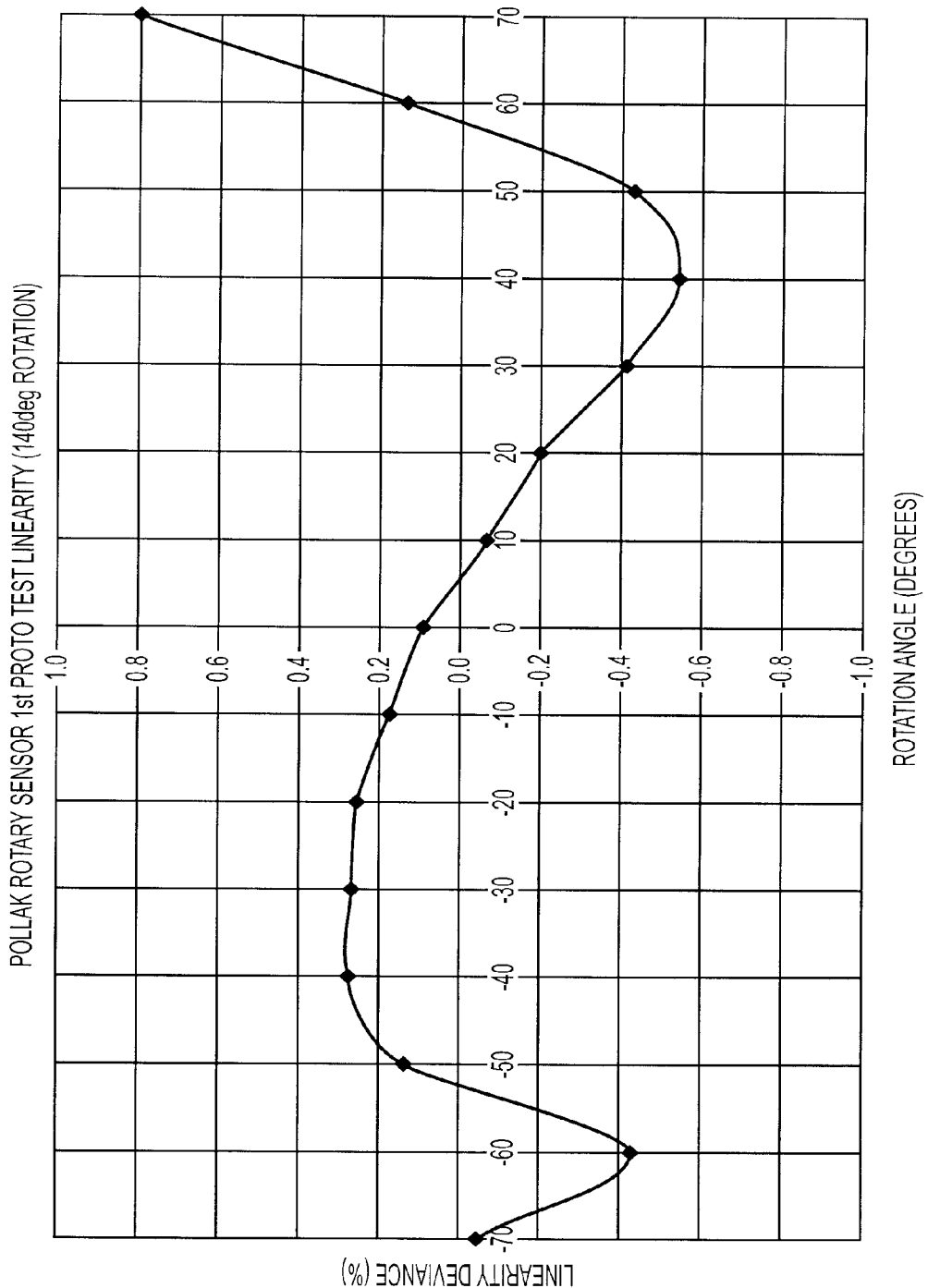

FIG. 20 illustrates test results for a prototype consistent with the rotary sensor 104 of FIG. 2. As illustrated, the output voltage remained relatively linear over a 140 degree rotation angle from negative 70 degrees to positive 70 degrees. FIG. 21 illustrates test results of the same prototype where the percent linearity deviance is plotted over the same 140 degree range. As illustrated, the percent linearity deviance was below 1.0% over the entire range and for most rotation angle positions was less than 0.4%.

Accordingly, there is provided a rotary sensor that can achieve good linear capability, e.g., less than 4.0% deviance beyond 100 degrees of rotation up to 140 degrees in some embodiments.

In summary, according to a first aspect of the present invention there may be provided a rotary position sensor. The rotary position sensor may include a first and a second magnet, in which the magnets may be spaced from on another. A first and a second triangular magnetic flux director may be disposed between the magnets. The magnetic flux directors may be arranged to provide a diamond shaped configuration and to define a gap therebetween. A magnetic field sensor system may be at least partially disposed in the gap between the first and second magnetic flux directors. The first and second magnets and the first and second magnetic flux directors, including the magnetic field sensor system disposed in the gap between the magnetic flux directors, may be rotatable relative to one another. The magnetic field sensor system may provide an output in response to a rotational position of the magnets relative to the magnetic flux directors and the magnetic field sensor system.

According to a second aspect, the present invention may provide a rotational position sensor assembly including a first housing having a steel ring and a first and a second magnet. The magnets may be disposed in a diametrically opposed arrangement inside of the ring. The sensor assembly may further include a second housing including a first and a second triangular magnetic flux director disposed to provide a generally diamond shaped arrangement. A magnetic field sensor system may be disposed in a gap between the first and second magnetic flux directors. The first housing and the second housing may be rotatable relative to one another for providing rotation of the magnetic flux directors, including the magnetic field sensor system, and the magnets relative to one another about an axis generally normal to a plane including the magnets and the magnetic flux directors.

According to yet another aspect, the present invention may provide a method of sending a rotational position of an element. The method may include disposing a first and second triangular magnetic flux director between a first and second magnet. The magnetic flux directors may be arranged to provide a generally diamond shape and to define a gap therebetween. The element may be coupled to one of the magnets and the magnetic flux directors. The method may further include disposing at least a portion of a magnetic field sensor system in the gap between the magnetic flux directors. The method may also include rotating the magnets and the magnetic flux directors, including the magnetic field sensor disposed in the gap, relative to one another about an axis generally normal to a plane including the magnets and the magnetic flux directors. The method may further include providing an output of the magnetic field sensor system in response to a rotational position of the magnetic flux directors relative to the magnets.

Various plots of magnetic fields, sensor output, rotational displacement, etc., have been shown and are described herein above. It should be understood that such plots may relate to theoretical models and/or to exemplary embodiments consistent with the present invention. As such, the plots should not be construed as limiting. Accordingly, various embodiments consistent with the present invention may exhibit characteristics, such as magnetic fields, sensor output, etc., which may differ from the data presented in the plots and described with reference thereto, without departing from the present invention.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the disclosure. Other modifications, variations, and alternatives are also possible.

What is claimed is:

1. A rotary position sensor comprising:
   a first and a second magnet, said magnets being spaced from one another;
   a first and a second triangular magnetic flux director disposed between said magnets, said magnetic flux directors defining a gap therebetween, and arranged to provide a generally diamond shape; and
   a magnetic field sensor system at least partially disposed in said gap between said first and second magnetic flux directors;
   said first and second magnets and said first and second magnetic flux directors, including said magnetic field sensor system disposed therebetween, being rotatable relative to one another about an axis generally normal to a plane including said magnets and said magnetic flux directors;
   said magnetic field sensor system providing an output in response to a rotational position of said magnets relative to said magnetic flux directors and said magnetic field sensor system.

2. The sensor according to claim 1, further comprising a steel ring disposed around at least a portion of said first and second magnets.

3. The sensor according to claim 1, wherein said magnetic field sensor system comprises at least one hall sensor.

4. The sensor according to claim 3, wherein said magnetic field sensor system comprises an array of hall sensors.

5. The sensor according to claim 4, wherein said magnetic field sensor system comprises an array of hall sensors including three rows comprising six sensors per row.

6. The sensor according to claim 1, further comprising a first housing comprising said first and second magnets, and a second housing comprising said first and second magnetic flux directors and said magnetic field sensor system, said first and second housings being rotatable relative to one another.

7. The sensor according to claim 1, wherein said output is substantially linear over a rotational displacement about 140 degrees.

8. The sensor according to claim 1, wherein said first and second magnets are magnetized along a generally parallel direction.

9. A rotational position sensor assembly comprising:
   a first housing comprising a steel ring and a first and a second magnet, said magnets disposed in a diametrically opposed arrangement inside said ring; and
   a second housing comprising a first and a second triangular magnetic flux director disposed to provide a generally diamond shaped arrangement, and a magnetic field sensor system disposed in a gap between said first and second magnetic flux directors;
   said first housing and second housing rotatable relative to one another for providing rotation of said magnetic flux directors, including said magnetic field sensor system disposed in said gap, and said magnets relative to one another about an axis generally normal to a plane including said magnets and said magnetic flux directors.

10. The sensor assembly according to claim 9, wherein said magnetic field sensor system comprises at least one hall sensor.

11. The sensor assembly according to claim 10, wherein said magnetic field sensor system comprises an array of hall sensors.

12. The sensor assembly according to claim 11, wherein said array of hall sensors comprises three rows comprising six hall sensors per row.

13. The sensor assembly according to claim 9, wherein said first housing comprises a recess extending between said magnets and wherein at least a portion of said second housing comprising said magnetic flux directors is configured to be rotatably disposed at least partially in said recess.

14. The sensor assembly according to claim 9, wherein said second housing comprises a lower housing portion comprising said first and second magnetic flux directors and an upper housing portion comprising said magnetic field sensor system, said upper and lower housing portions configured to be assembled with at least a portion of said magnetic field sensor system disposed in said gap.

15. The sensor assembly according to claim 9, further comprising a torsion spring disposed between said first and second housing and configured to provide a rotational bias between said first and second housing.

16. A method of sensing a rotational position of an element comprising:
   disposing a first and second triangular magnetic flux director between a first and second magnet, said magnetic flux directors arranged to provide a generally diamond shape and to define a gap therebetween, said element coupled to one of said magnets and said magnetic flux directors;

disposing at least a portion of a magnetic field sensor system in said gap;

rotating said magnets and said magnetic flux directors, including said magnetic field sensor system disposed in said gap, relative to one another about an axis generally normal to a plane including said magnets and said magnetic flux directors; and providing an output of said magnetic field sensor system in response to a rotational position of said magnetic flux directors relative to said magnets.

17. The method according to claim 16, wherein said magnetic field sensor system comprises at least one hall sensor.

18. The method according to claim 17, wherein said magnetic field sensor system comprises an array of hall sensors.

19. The method according to claim 16, further comprising disposing a steel ring around at least a portion of said magnets and said magnetic flux directors.

20. The method according to claim 19, wherein said steel ring is rotationally fixed relative to said magnets.

* * * * *

UNITED STATES PATENT AND TRADEMARK OFFICE
CERTIFICATE OF CORRECTION

PATENT NO. : 7,372,257 B2 Page 1 of 1
APPLICATION NO. : 11/463522
DATED : May 13, 2008
INVENTOR(S) : Frank It is certified that error appears in the above-identified patent and that said Letters Patent is hereby corrected as shown below:

On the title page, in field (73), in "Assignee", in column 1, line 1, delete "Stonebridge" and insert -- Stoneridge --, therefor.

Signed and Sealed this

Twelfth Day of August, 2008

JON W. DUDAS
*Director of the United States Patent and Trademark Office*